US012630278B2

(12) United States Patent
Chand et al.

(10) Patent No.: US 12,630,278 B2
(45) Date of Patent: May 19, 2026

(54) PORTABLE MOTORIZED PROPULSION SYSTEM FOR A WATERCRAFT

(71) Applicant: ZOOM FINS LLC, Sherman Oaks, CA (US)

(72) Inventors: Sri Jagdesh Chand, Pune (IN); Siddharth Ramesh Notaney, Pune (IN); Gary S Monroe, Sherman Oaks, CA (US); Vishnu Bhagawan Barote, Chinchwad Pune (IN)

(73) Assignee: Zoom Fins LLC, Sherman Oaks (CA)

( * ) Notice: Subject to any disclaimer, the term of this patent is extended or adjusted under 35 U.S.C. 154(b) by 719 days.

(21) Appl. No.: 18/050,588

(22) Filed: Oct. 28, 2022

(65) Prior Publication Data

US 2024/0140578 A1     May 2, 2024

(51) Int. Cl.
| | |
|---|---|
| *B63H 21/21* | (2006.01) |
| *B60L 58/10* | (2019.01) |
| *B63B 32/10* | (2020.01) |
| *B63H 21/17* | (2006.01) |
| *G05D 1/00* | (2006.01) |
| *H01M 10/42* | (2006.01) |
| *H01M 10/48* | (2006.01) |
| *H01M 50/24* | (2021.01) |
| *H01M 50/249* | (2021.01) |
| *H01M 50/262* | (2021.01) |

(52) U.S. Cl.
CPC .............. *B63H 21/21* (2013.01); *B60L 58/10* (2019.02); *B63B 32/10* (2020.02); *B63H 21/17* (2013.01); *G05D 1/0016* (2013.01); *G05D 1/0022* (2013.01); *G05D 1/0206* (2013.01); *H01M 10/425* (2013.01); *H01M* *10/486* (2013.01); *H01M 50/24* (2021.01); *H01M 50/249* (2021.01); *H01M 50/262* (2021.01); *B60L 2200/32* (2013.01); *B60L 2240/545* (2013.01); *B63H 2021/216* (2013.01); *H01M 2010/4271* (2013.01); *H01M 2220/20* (2013.01)

(58) Field of Classification Search
CPC .......... B63H 21/21; B63B 32/10; B60L 58/10
See application file for complete search history.

(56) References Cited

U.S. PATENT DOCUMENTS 5,666,012 A * 9/1997 Gongwer ............... H02K 5/124
                                                        277/927
6,855,016 B1 * 2/2005 Jansen ................... B63H 21/17
                                                        440/27

(Continued)

FOREIGN PATENT DOCUMENTS

DK          201900074 U1 * 10/2019 ............. B66C 13/46

Primary Examiner — Marc Q Jimenez
Assistant Examiner — Jovon E Hayes
(74) Attorney, Agent, or Firm — FishreBoyles, LLP; Susan M. Oiler

(57) ABSTRACT

An apparatus, a method, and a system for controlling and propelling a watercraft. The apparatus has a set of motors and a fin-shaped hollow structure attached to the water-facing surface of the watercraft, a wireless controller to receive input commands from a user and transmit the input commands to a microprocessor to control the set of motors based on input commands. The input commands correspond to a speed and a direction. The microprocessor can adjust a thrust force of the set of motors based on the input commands to propel the watercraft in a selected direction at a selected speed.

9 Claims, 3 Drawing Sheets

(56)  References Cited

U.S. PATENT DOCUMENTS

| 8,386,081 | B2 * | 2/2013 | Landry | ................ | G05D 1/0272 |
| | | | | | 700/250 |
| 10,150,544 | B2 * | 12/2018 | Schibli | ................... | B63H 16/14 |
| 10,683,075 | B2 * | 6/2020 | Schibli | ................... | B63B 34/20 |
| 11,352,117 | B1 * | 6/2022 | Blew | ...................... | B63H 21/17 |
| 11,400,360 | B1 * | 8/2022 | Crockett | ................ | A63C 5/085 |
| 11,703,866 | B2 * | 7/2023 | Snyder | ................... | B63B 79/40 |
| | | | | | 701/21 |
| 2015/0357845 | A1 * | 12/2015 | Railey | ................... | H01M 10/48 |
| | | | | | 320/136 |
| 2019/0106190 | A1 * | 4/2019 | Schibli | ................ | B63H 20/007 |
| 2022/0126966 | A1 * | 4/2022 | Lammers-Meis | ...... | B63H 20/06 |

* cited by examiner

200

202

PORTABLE MOTORIZED PROPULSION SYSTEM FOR A WATERCRAFT

PRIORITY INFORMATION

The present application does not claim a priority from any other application.

TECHNICAL FIELD

The present invention relates generally to an apparatus, a system, and a method for controlling and propelling a watercraft. More particularly, the invention relates to an apparatus that is easily attachable to a watercraft, is motorized, and is controllable using a controller.

BACKGROUND

Watercrafts are generally used to carry a person across a body of water. Paddleboards and surfboards are generally propelled by humans using their hands, or a stick to manipulate the board on waves. These methods may be physically challenging. To make it easier, a few watercrafts have an in-built motorized structure for propulsion. These systems typically include modification to the watercraft structure, or a specialized watercraft structure that is adapted to include a propulsion apparatus at the time of manufacture. These systems are expensive and are economically out of the reach of most persons.

SUMMARY

Before the present apparatus, system(s) and method(s), are described, it is to be understood that this application is not limited to the particular apparatus, system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to an apparatus, a system and a method for propelling and controlling a watercraft. This summary is not intended to identify essential features of the claimed subject matter nor is it intended for use in determining or limiting the scope of the claimed subject matter.

In one implementation, an apparatus for propelling a watercraft is disclosed. The apparatus may comprise a fin-shaped hollow structure adapted to be attached to a bottom side of a watercraft. The fin-shaped hollow structure may be saltwater-resistant. The fin-shaped hollow structure may enclose a microprocessor, a battery, a battery management system, and electrical connections. The fin-shaped hollow structure may be waterproof. The battery may be operatively coupled to the set of motors for providing electric power. The battery management system may monitor battery status and/or battery temperature and send an alert to the controller when the battery status is below a pre-defined threshold.

The fin-shaped hollow structure may have a set of motors attached to it comprising a left motor and a right motor on either side of the structure. Each motor of the set of motors may be a differential motor having a bi-directional propellor. The apparatus may comprise a controller that may be wirelessly connected to the microprocessor. The controller may receive input commands from a user for controlling the set of motors in order to propel the watercraft. The controller may have a display and a user interface for receiving the input commands and displaying a real-time location of the user.

In one implementation, a system and a method for controlling the set of motors to propel the watercraft is disclosed. The method may comprise receiving input commands from a user. The input commands may correspond to a direction, and a speed. The direction may be at least one of a compass direction, an angle between 0° and 360°, forward, reverse, left, right, a combination of at least two of forward, left, and right, and a combination of at least two of reverse, left and right. Further, the method may comprise controlling the set of motors based on the input commands by adjusting a thrust force of each motor of the set of motors. The thrust force may be adjusted by at least one of increasing the thrust force of at least one motor, decreasing the thrust force of at least one motor, and increasing the thrust force of one motor and decreasing the thrust force of another motor. The thrust force is adjusted between a pre-defined minimum thrust force and a pre-defined maximum thrust force. In an implementation, the method may comprise rendering real-time location of the user on the controller.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figure. In the figure, the left-most digit(s) of a reference number identifies the figure in which the reference number first appears. The same numbers are used throughout the drawing to refer like features and components.

Figure 1:
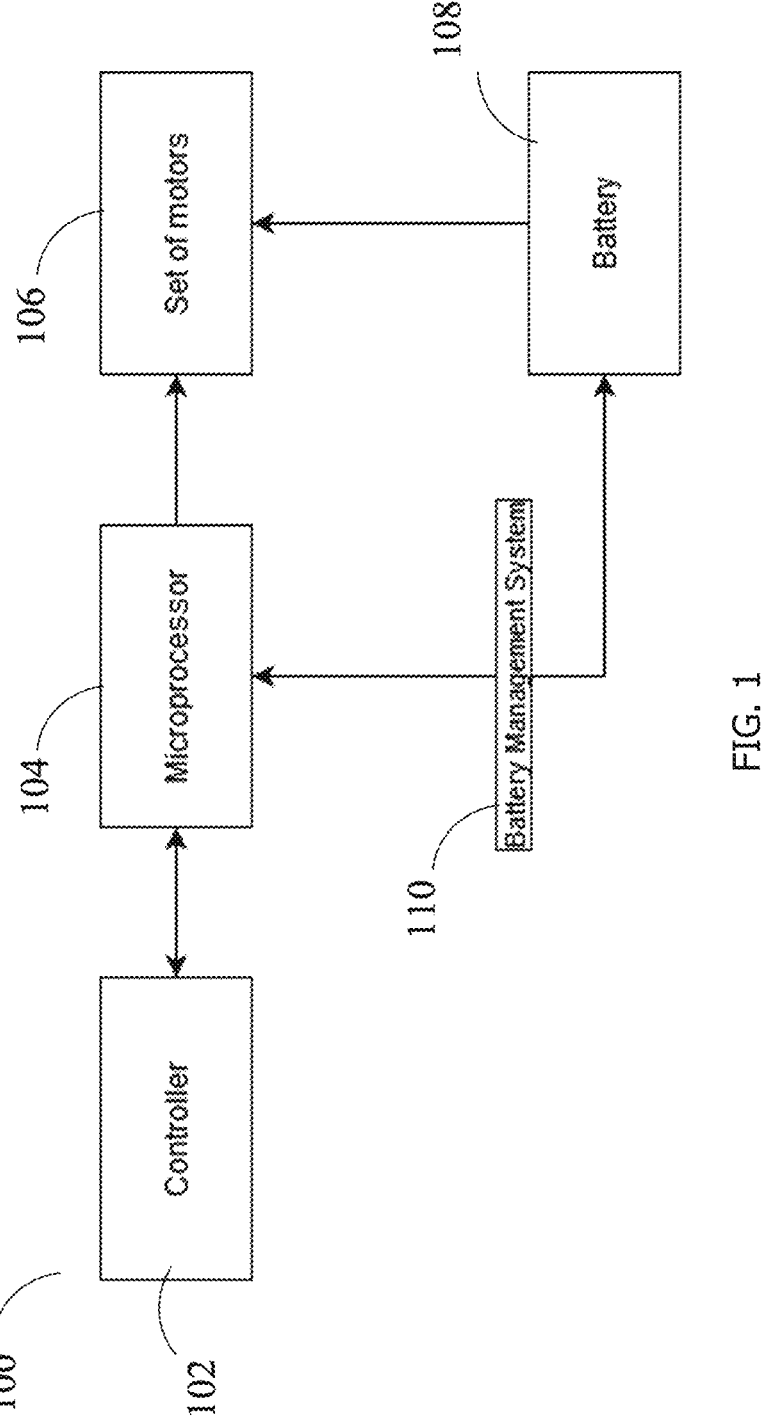
FIG. 1 illustrates an embodiment of a system for controlling a set of motors to propel a watercraft.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

In the following description, for purposes of explanation, numerous specific details are set forth in order to provide a thorough understanding of the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As will be appreciated by one skilled in the art, the aspects of the present invention may be embodied as a system, a method, or a computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "engine," "module," "apparatus," or "system." Furthermore, aspects of the present invention may take the form of a computer program product embodied in one or more computer readable medium(s) having computer readable program code embodied thereon.

Broadly, an embodiment of the present invention discloses an apparatus (300), a method, and a system (100) for controlling and propelling a watercraft (200). In one embodiment, the term "watercraft" may correspond to a structure having two surfaces, one water-facing and one up-ward facing surface to accommodate a person. The structure is made of a material having a density low enough to remain afloat withstanding the weight of a person, and strength high enough to hold the weight of a person. As used herein, the "water-facing" surface of the watercraft corresponds to the surface below the surface of the water with a mass or load on the opposite surface. The "up-ward facing" surface of the watercraft corresponds to the surface opposite to the water-facing surface upon which a mass or a load may rest while the watercraft floats on the surface of water. The watercraft may be a paddleboard, a surfboard, or the like.

Referring now to FIG. 1, the system 100 for controlling and propelling a watercraft is illustrated. The system comprises a controller 102. The controller may be a wireless remote or a mobile device such as a smartphone, a wearable device, a tablet with an application installed on the mobile device. The controller may receive input commands from a user through a graphical user interface (GUI) or through a microphone. In an embodiment, the wearable controller may have gyro sensors to receive input commands based on a movement made by the user or a gesture made by the user.

The input commands may include an input speed or an input direction or both. The controller may receive the input command through at least a speed bar, a speed throttle, and a number pad displayed on the GUI in order to set the input speed of the watercraft. In another aspect, the controller may receive the input command as a voice command through a microphone. In order to receive input command for setting a direction, the controller may have at least a user interface displaying compass directions in a circle, a user interface with a circle marked with angles from 0° to 360° and a joystick that may be used by the user to point at an angle between 0° and 360°. The 0° angle may correspond to head of the watercraft on the longitudinal axis.

The controller may transmit the input commands to a microprocessor 104. The controller may be connected to the microprocessor using a Bluetooth module The microprocessor may be based on Arduino IDE customized for uBlox B704 module application. The microprocessor may process the input commands and determine an output thrust force for each motor of a set of motors 106 based on the input speed and the direction. The set of motors 106 may comprise two motors of 700 W power rating. Each motor may have a bidirectional rotating propellor. Each motor may be connected to a battery with insulated wiring.

The microprocessor may adjust speed of rotation of propellors of the set of motors based on the thrust force. The microprocessor may control the amount of electric power to be transmitted to the set of motors from the battery. The amount of power may be calculated based on a predefined set of rules and specifications for the set of motors. The control document may comprise of a set a power values and corresponding speed of rotation of the propellors.

In an embodiment, the microprocessor may be programmed to calculate the required speed of rotation for the propellors to propel the watercraft at the target speed received as input command, using a machine learning algorithm. The machine learning algorithm may be trained using a training data set of input speed, speed of rotation of propellors, and current speed of the watercraft. The machine learning algorithm may calculate the speed of rotation of the propellors as an output for an input of input speed and current speed of the watercraft. The current speed of the watercraft may be measured using GPS on the controller. The microprocessor may calculate the speed based on a distance covered in a small amount of time. For example, the microprocessor may measure the distance covered by the watercraft in two seconds. Further, divide the distance covered by 2 seconds to find the speed. The microprocessor may increase or decrease the amount of power to match the current speed of the watercraft and the input speed.

In an embodiment, the microprocessor may be programmed to turn the watercraft in the direction received as input command (input direction) by at least one of increasing the speed of rotation of the propellor of one motor, decreasing the speed of rotation of the propellor of other motor, simultaneously increasing the speed of rotation of the propellor of one motor and decreasing the speed of rotation of the propellor of another motor until the current direction of the watercraft matches the input (target) direction, where the direction is measured with the help of the GPS of the controller. The microprocessor may increase the speed of rotation of the propellor up to a predefined threshold.

The microprocessor may calculate the speed of rotation of the propellors based on the input direction and input speed using a machine learning algorithm. The machine learning algorithm may be trained on a training dataset of turning angle, input speed, individual speed of rotation of the propellor of each motor. The machine learning algorithm may calculate the individual speed of rotation of the propellor of each motor as an output for an input of input speed and turning angle.

The microprocessor may determine the turning angle based on the input direction and current direction of the watercraft using a machine learning model. The current direction of the watercraft may be determined using the GPS of the controller. The machine learning model may be trained using a training dataset of input speed, input direction, current speed of the watercraft, current direction of the watercraft, and corresponding turning angle. The machine learning model may calculate a turning angle as output for an input of current direction of the watercraft and input direction.

Consider an example, the input speed is 2 knots, the current speed according to the GPS of the controller is 3 knots. The microprocessor may reduce the speed of rotation of the propellors of both motors by 30%.

Consider another example, the input speed is 2 knots, the current speed is 1 knot. The microprocessor may increase the speed of rotation of the propellors of both motors by 100%.

Consider another example, the input speed is 2 knots, the input direction is North-West, the current speed of the watercraft is 2 knots, and the current direction of the watercraft is North. The turning angle is calculated as 90°. The microprocessor may increase the speed of rotation of the propellor of left motor by 100% and decrease the speed of rotation of the propellor of right motor by 50% until the current direction of the watercraft becomes North-West. After the current direction of the watercraft becomes North-West, the microprocessor may decrease the speed of rotation of the propellor of the left motor by 100% and increase the speed of rotation of the propellor of the right motor by 50%.

In an embodiment, the set of motors may be controlled by the user to operate in three modes. The three modes may be low, medium, and high. Each mode may have a predefined speed. The user may select the mode using the controller. The speed of rotation of the propellors may be set based on the mode selected by the user.

In an embodiment, the controller may have a reverse button. The reverse button may trigger the microprocessor to reverse the direction of rotation of the propellors.

The set of motors may consume electric power from the battery 108 to produce the thrust force by rotating the propellors. In an embodiment, the battery may have a total capacity of 10 Ah. The battery may be a twin battery of 5 Ah capacity each. The system may be configured to accommodate an external battery to extend battery capacity for using the system for longer time periods. The battery may be rechargeable. The apparatus 200 may have a charging slot on the fin-shaped hollow structure to connect an external charging cable to charge the battery.

In an embodiment the system may be configured to cut power supply from the battery to the set of motors in case the microprocessor and the controller are disconnected for a predefined time period. The predefined time period may be zero to thirty seconds. The microprocessor and the controller may get disconnected in case the controller is out of the range of the BLE module used to connect the microprocessor and the controller.

The system further comprises a battery management system 110 to monitor battery status, battery temperature, and battery health. The battery status may correspond to the amount of charge remaining in the battery. The battery status may be a percentage between 0 and 100. The battery management system may continuously measure the voltage, amperage and power discharged to calculate the battery status. The battery management system may determine the battery temperature from data received using one or more sensors like a temperature sensor. The battery management system may calculate the battery health based on the voltage, amperage, and power discharged for a plurality of charge cycles.

The battery management system 110 is configured to perform one or more fail safe operations. The one or more failsafe operations include at least one of:

a) Reduce power transmitted to the set of motors in case of over-heating. The battery management system may determine over-heating when the battery temperature rises above a predefined threshold battery temperature.

b) Reduce power transmitted to the set of motors in case the battery status is below a predefined threshold.

In an embodiment, the controller may have a mobile application to control the watercraft. The application may have multiple screens and functions including:

a) Social Page—The user may be able to send, receive, and accept friend requests to other users of the mobile application and view activity of the friends. The activity may be time spent on watercraft, total distance covered, distance covered in a day, current location, and alike. Each user may select a privacy setting for the type of activity that is visible to friends.

b) Remote Page—The user may be able to control the watercraft using the controls on this page. The controls may include a speed bar, a joystick, a compass, and alike.

Figure 2:
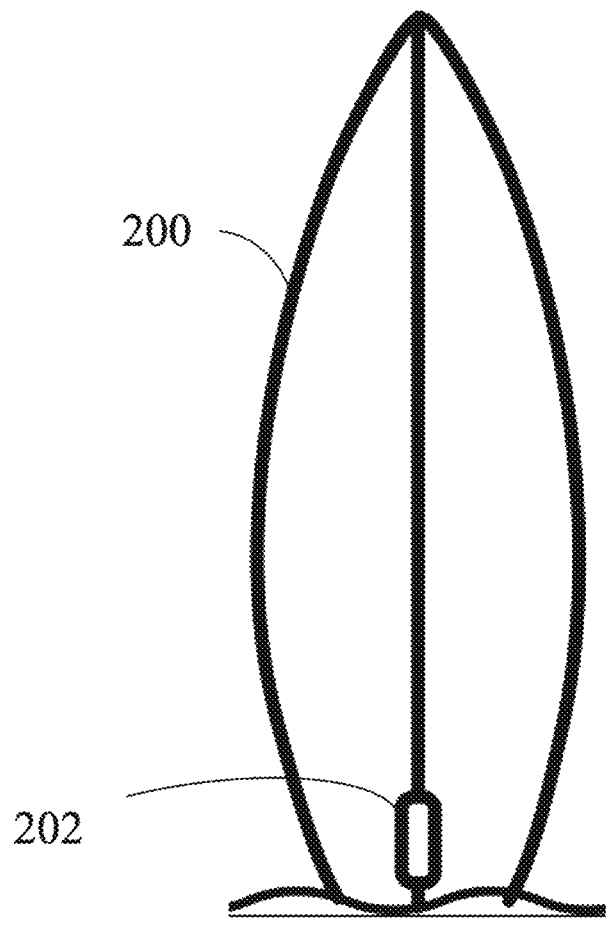
FIG. 2 illustrates an example of a watercraft.

Referring now to FIG. 2, a watercraft 200 is illustrated. The watercraft may have a slit 202 cut-out through the watercraft for the propelling apparatus to be attached to the watercraft using a fastening or a locking mechanism such as a center flip-lock mechanism or a sliding lock mechanism. The watercraft may have a water-facing side and an up-ward facing side.

Figure 3:
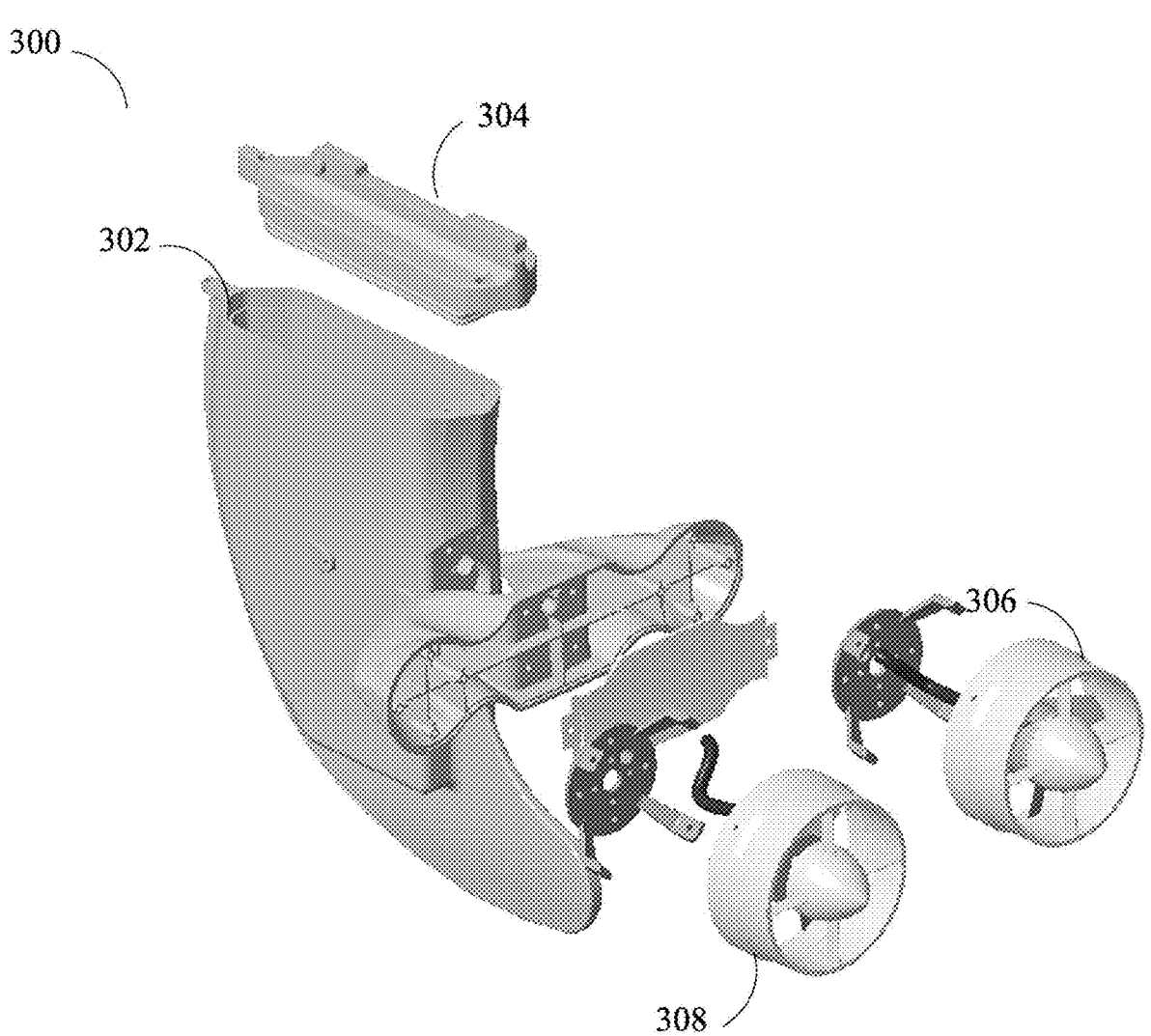
FIG. 3 illustrates an apparatus for propelling a watercraft.

Referring now to FIG. 3, an embodiment of an apparatus 300 for propelling a watercraft is illustrated. The apparatus comprises a fin-shaped hollow structure 302 that may be attached to the water-facing side of the watercraft. The fin-shaped hollow structure may have a lid 304 with a center flip-lock mechanism. The fin-shaped hollow structure may be pushed through the slit 202 on the water-facing surface up to a particular height. The lid may be placed on the fin-shaped hollow structure protruding from the slit 202. The center flip-lock mechanism may be used to lock the fin-shaped hollow structure (fin) on the watercraft. The apparatus further comprises a set of motors connected to the fin-shaped hollow structure. The set of motors comprises a left motor 308 on the left side of the fin and a right motor 306 on the right side of the fin.

Exemplary embodiments discussed above may provide certain advantages. Though not required to practice aspects of the disclosure, these advantages may include the following.

In some embodiments, the wear and tear caused in ordinary fin based propelling systems caused due to the movement of the fin is reduced by the turning mechanism employing differential speed using twin motors.

In some embodiments, the apparatus may reduce the physical effort of a user.

It may be noted that the users may control the system through a mobile device such as a smartphone and alike, collectively referred to as controllers 102, hereinafter, or applications residing on the controllers 102.

In one embodiment, the controller and microprocessor may include at least one processor, an input/output (I/O) interface, a memory, a database and one or more engine(s). The at least one processor may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the system 100 to interact with the user directly or through the controllers 102. Further, the I/O interface may enable the system 100 to communicate with other computing devices, such as web servers and external data servers (not shown). The I/O interface can facilitate multiple communications within a wide variety of networks and protocol types, including wired networks, for example, LAN, cable, etc., and wireless networks, such as Bluetooth, WLAN, cellular, or satellite. The I/O interface may include one or more ports for connecting a number of devices to one another or to another server.

The memory may include any computer-readable medium or computer program product known in the art including, for example, volatile memory, such as static random-access memory (SRAM) and dynamic random-access memory (DRAM), and/or nonvolatile memory, such as read only memory (ROM), erasable programmable ROM, flash memories, hard disks, Solid State Disks (SSD), optical disks, and magnetic tapes. The memory may include routines, programs, objects, components, data structures, etc., which perform particular tasks or implement particular abstract data types. The memory may include engine(s), programs or coded instructions that supplement applications and functions of the system 100. In one embodiment, the memory, amongst other things, serves as a repository for storing data processed, received, and generated by one or more of the engine(s), programs or the coded instructions.

Computing system can include clients and servers. A client and server are generally remote from each other and typically interact through a communication network. The relationship of client and server arises by virtue of computer programs running on the respective computers and having a client-server relationship to each other. Computer system can be, for example, and without limitation, a desktop computer, laptop computer, or tablet computer. Computer system can also be embedded in another device, for example, and without limitation, a mobile telephone, a personal digital assistant (PDA), a mobile audio player, a Global Positioning System (GPS) receiver, a video game console, and/or a television set top box.

Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples, and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for propelling a watercraft, comprising:
a set of motors attached to a bottom surface of a watercraft, wherein the bottom surface is a water-facing surface, and wherein the set of motors comprises a left motor and a right motor;

a controller, in communication with a microprocessor, having a user interface and a display for receiving input commands from a user for controlling the set of motors, and displaying location information of the user; and a structure adapted to be attached to the set of motors and the bottom surface of the watercraft using a fastening mechanism or a locking mechanism, wherein the fastening mechanism or the locking mechanism is a center flip-lock mechanism or a sliding lock mechanism, and wherein the structure is waterproof and encloses:

a microprocessor communicatively coupled to the controller to control the set of motors based on the input commands;

a battery management system to monitor battery status, battery temperature and send an alert to the controller when the battery status is below a pre-defined threshold.

2. The apparatus of claim 1, wherein the watercraft is at least one of a surfboard, a paddleboard, a floating structure with two flat surfaces.

3. The apparatus of claim 1, wherein the structure is saltwater-resistant.

4. The apparatus of claim 1, wherein each motor of the set of motors is a differential motor having a bi-directional propellor.

5. The apparatus of claim 1, further comprising a mechanism for opening the structure to replace or recharge the battery when the alert is received on the controller.

6. The apparatus of claim 1, further comprising a battery, operatively coupled to the set of motors, for providing electric power to the set of motors.

7. The apparatus of claim 1, wherein the controller is at least one of a wireless computing device, a wireless remote, and a mobile phone having an application to control the watercraft.

8. The apparatus of claim 1, wherein the controller communicates with the microprocessor using a Bluetooth module.

9. The apparatus of claim 1, further configured to turn off automatically when the microprocessor is not in range of the controller.

* * * * *